(12) United States Patent
Kjær et al.

(10) Patent No.: US 10,920,747 B2
(45) Date of Patent: Feb. 16, 2021

(54) METHOD FOR CONTROLLING HYDRAULIC PITCH FORCE SYSTEM

(71) Applicant: Vestas Wind Systems A/S, Aarhus N. (DK)

(72) Inventors: Martin Ansbjerg Kjær, Harlev J. (DK); Frank Møller Hansen, Arden (DK); Jacob Hviid Nielsen, Tjele (DK); Jesper Lykkegaard Neubauer, Hornslet (DK); Poul Brandt Christensen, Ry (DK); Fabio Caponetti, Århus C (DK); Christian Skallebæk, Randers NV (DK); Robert Grøn-Stevens, Randers NØ (DK); Kasper Zinck Østergaard, Flemming (DK)

(73) Assignee: Vestas Wind Systems A/S, Aarhus N. (DK)

( * ) Notice: Subject to any disclaimer, the term of this patent is extended or adjusted under 35 U.S.C. 154(b) by 121 days.

(21) Appl. No.: 15/767,258

(22) PCT Filed: Oct. 11, 2016

(86) PCT No.: PCT/DK2016/050328
§ 371 (c)(1),
(2) Date: Apr. 10, 2018

(87) PCT Pub. No.: WO2017/063654
PCT Pub. Date: Apr. 20, 2017

(65) Prior Publication Data
US 2019/0078555 A1     Mar. 14, 2019

(30) Foreign Application Priority Data
Oct. 14, 2015   (DK) .......................... PA 2015 70657

(51) Int. Cl.
F03D 7/02        (2006.01)

(52) U.S. Cl.
CPC ........... *F03D 7/0224* (2013.01); *F03D 7/024* (2013.01); *F03D 7/0264* (2013.01);
(Continued)

(58) Field of Classification Search
CPC ...... F03D 7/0224; F03D 7/024; F03D 7/0264; F05B 2260/406; Y02E 10/723
See application file for complete search history.

(56) References Cited

U.S. PATENT DOCUMENTS 4,348,155 A * 9/1982 Barnes .................... F03D 7/024
                                                      416/46
4,503,673 A * 3/1985 Schachle .................. F03D 7/04
                                                      60/398

(Continued)

FOREIGN PATENT DOCUMENTS

| CN | 101583793 A | 11/2009 |
|---|---|---|
| CN | 101956658 A | 1/2011 |

(Continued)

OTHER PUBLICATIONS

Danish Patent and Trademark Office, Search and Examination Report in PA 2015 70657, dated May 12, 2016.

(Continued)

*Primary Examiner* — David E Sosnowski
*Assistant Examiner* — Wesley Le Fisher
(74) *Attorney, Agent, or Firm* — Wood Herron & Evans LLP

(57) ABSTRACT

There is provided a method for controlling a hydraulic pitch force system (220) so as to reduce or eliminate a decrease in hydraulic oil pressure (241) if a hydraulic system parameter value is outside a hydraulic system parameter range, the method comprising: Obtaining (690) the hydraulic system parameter value, and operating the hydraulic pitch force system (220) according to a reduced mode (692) if the (Continued)

hydraulic system parameter value is outside the hydraulic system parameter range, wherein in the reduced mode one or more pitch based activities are reduced (694) or suspended. An advantage thereof may be that it enables keeping the wind turbine in production in certain instances rather than shutting down the wind turbine. In aspects, there is furthermore presented a computer program product, a pitch control system (250) and a wind turbine (100).

16 Claims, 4 Drawing Sheets

(52) U.S. Cl.
CPC ..... *F05B 2260/406* (2013.01); *F05B 2260/76* (2013.01); *F05B 2270/301* (2013.01); *F05B 2270/604* (2013.01); *Y02E 10/72* (2013.01)

(56) References Cited

U.S. PATENT DOCUMENTS

| | | | | |
|---|---|---|---|---|
| 6,361,275 | B1* | 3/2002 | Wobben | F03D 7/0224 416/33 |
| 8,561,397 | B2* | 10/2013 | Egedal | F15B 19/005 60/327 |
| 8,807,937 | B2* | 8/2014 | Stiesdal | F03D 7/0224 416/1 |
| 8,922,039 | B2* | 12/2014 | Andersen | F03D 7/0224 290/44 |
| 9,121,385 | B2* | 9/2015 | Andersen | F03D 1/0658 |
| 2007/0057517 | A1* | 3/2007 | McNerney | F03D 7/0224 290/44 |
| 2009/0108582 | A1* | 4/2009 | Seibers | F03D 7/02 290/44 |
| 2010/0209245 | A1 | 8/2010 | Migliori | |
| 2011/0304140 | A1 | 12/2011 | Minami et al. | |
| 2012/0134806 | A1* | 5/2012 | Andersen | F03D 1/0658 416/1 |
| 2013/0134708 | A1* | 5/2013 | Hamano | F03D 7/0264 290/43 |
| 2013/0323051 | A1 | 12/2013 | Yuge et al. | |
| 2015/0110596 | A1* | 4/2015 | Huang | F03D 17/00 415/1 |

FOREIGN PATENT DOCUMENTS

| | | |
|---|---|---|
| DE | 102010019444 A1 | 11/2011 |
| EP | 0020207 A1 | 12/1980 |
| EP | 2270342 A1 | 1/2011 |
| EP | 2402596 A2 | 1/2012 |
| EP | 2402604 A2 | 1/2012 |

OTHER PUBLICATIONS

European Patent Office, International Search Report and Written Opinion in PCT/DK2016/050328, dated Jan. 18, 2017.

Chinese Patent Office, Office Action in CN Application No. 201680072752.6, dated Apr. 12, 2019.

* cited by examiner

METHOD FOR CONTROLLING HYDRAULIC PITCH FORCE SYSTEM

FIELD OF THE INVENTION

The invention relates to a method for controlling a pitch force system, and more particularly to a method for controlling a hydraulic pitch force system for pitching a blade of a wind turbine and a corresponding pitch control system, wind turbine and computer program product.

BACKGROUND OF THE INVENTION

In some wind turbines a hydraulic pitch system is used to control the pitch angle of the rotor blades in order to optimise the wind energy production and to ensure that the rotor blades are not subjected to too large loads when strong winds are blowing.

To perform the pitch each blade is provided with a pitching arrangement comprising a pitch bearing between the hub and the blade, and a pitch mechanism in the form of a hydraulic actuator, to provide the force for pitching the blade and maintaining it in a given position. This hydraulic actuator is powered by a hydraulic pump.

Normal production below rated wind speed does typically not require large hydraulic power consumption for the hydraulic pitch system, e.g. since the wind speed may not change much, and an optimal angle of attack of the blades can e.g. be maintained by controlling the rotor speed. However, e.g., under full load conditions and/or in turbulent conditions, the pitch system can be used more, and the requirements to the pitch system may even exceed its capability.

Since situations where the requirements to the pitch force system exceeds its capability may lead to shut down of an associated wind turbine due to depletion of the available pitching force, the inventor of the present invention has appreciated that an improved method for controlling a pitch force system would be advantageous, and in particular a method, which may enable continued operation of the wind turbine even in conditions where the requirements to the pitch system exceed its capability, and has in consequence devised the present invention.

SUMMARY OF THE INVENTION

It may be seen as an object of the present invention to provide a method for controlling a hydraulic pitch force system for pitching a blade of a wind turbine and a corresponding pitch control system, wind turbine and computer program product that may yield the above mentioned advantages.

It is a further object of the present invention to provide an alternative to the prior art.

According to a first aspect, the present invention relates to a method for controlling a hydraulic pitch force system so as to reduce or eliminate a decrease in hydraulic oil pressure if a hydraulic system parameter value is outside a hydraulic system parameter range, the method comprising:
  Obtaining the hydraulic system parameter value, which hydraulic system parameter value is a value corresponding to a hydraulic system parameter,
  operating the hydraulic pitch force system according to a reduced mode if the hydraulic system parameter value is outside, such as above or below, the hydraulic system parameter range,
wherein in the reduced mode:
  One or more pitch based activities are reduced or suspended.

It may be seen as an insight of the present inventors, that reducing or suspending one or more pitch based activities may be advantageous since it may enable avoiding shutting down wind turbine operation. Instead the one or more pitch based activities related to, e.g., structural load reduction may be reduced or suspended and optionally a wind turbine operation may be adjusted accordingly. Another possible advantage of the present invention may be that it enables dispensing with a need to provide a high capacity pitching system.

In an embodiment:
  The hydraulic system parameter value is a value corresponding to a hydraulic system parameter, and wherein the hydraulic system parameter is given by a hydraulic oil pressure, and
  the hydraulic system parameter range is given by a range above an oil pressure threshold.

An advantage of this embodiment may be that it enables identifying a low hydraulic oil pressure, such as an accumulator pressure, and take an appropriate measure, namely having one or more pitch based activities being reduced or suspended, which may in turn facilitate that the hydraulic oil pressure may be increased while the wind turbine is kept producing.

In an embodiment:
  The hydraulic system parameter value is a value corresponding to a hydraulic system parameter, and wherein the hydraulic system parameter is given by a parameter indicative of leakage from the hydraulic pitch force system, and
  the hydraulic system parameter range is given by a range below a threshold leakage value.

An advantage of this embodiment may be that it enables identifying a leakage from the hydraulic pitch force system, such as in any one or more of cylinder, pump, valve, tank, accumulator and fluidic connections between these components. Upon identification of a leakage, it is then possible to take an appropriate measure, namely having one or more pitch based activities being reduced or suspended, which may in turn facilitate that the leak may be identified that the wind turbine can be kept running (producing) for a period, such as for an extended period with respect to a situation where reduced mode is not entered, e.g., until repair is possible.

Obtaining a parameter indicative of leakage from the hydraulic pitch force system may for example be realized by observing a flow supplied by the pump (for example for a fixed displacement flow, this equals the time the pump is active multiplied by nominal supply flow) and a displacement flow (calculated by the piston movement of the cylinder piston multiplied by the piston diameter). If a discrepancy between the supply flow and displacement flow arises, there is a leakage in the system. Dependent on the size of the leakage different reactions can be made, either a complete stop of individual pitching (suspending the one or more pitch based activities), or by reducing the one or more pitch based activities.

By 'reducing' is generally understood non-zero, but reduced movement, such as reduced angular movement. It is to be understood that the movement may or may not be periodical.

By 'suspended' is generally understood removal, such as complete removal, such as zero angular movement.

The 'reducing' and 'suspending' in the 'reduced mode' may be understood to be seen relative to an angular movement of the one or more pitch based activities in a non-reduced (or normal) mode.

The 'range' may be open ended, e.g., if a value is (only) outside the range if it is above or below a certain threshold. The 'range' may be understood to correspond to one or more intervals. For example, a 'non-reduced mode' (normal mode) may apply if a hydraulic oil pressure is above a first threshold (corresponding to an interval with a lower limit and an upper open end, e.g., above 200 bar), a 'shut down mode' may apply if a hydraulic oil pressure is below a second threshold (corresponding to a second interval with an upper limit and a lower open end, where the second threshold is lower than the first threshold, e.g., below 175 bar), and a 'reduced mode' applies if the hydraulic pressure is outside the range corresponding to the first interval and the second interval, such as between the first interval and the second interval (such as from 175-200 bar, both endpoints included). It may also be conceivable that the 'hydraulic parameter range' is multi-dimensional, such as entry into the 'reduced mode' being dependent on multiple parameters, such as both a hydraulic oil pressure and a wind speed.

In embodiments the one or more pitch based activities, which are reduced or suspended, corresponds to an individual blade pitch control activity, such as to one or more individual pitch control activities, such as all of the, individual pitch control activities. In an embodiment, the one or more pitch based activities, which are reduced or suspended, corresponds to a strict subset of all individual blade pitch control activities (such as on or more of the individual blade pitch control activities, but not all of the individual blade pitch control activities).

An advantage of this embodiment may be that it enables reducing the requirements to the pitch system, since individual pitch based activities are typically relatively demanding, while it retains the option of controlling power production since this is typically carried out via collective pitch control.

In an embodiment, the one or more pitch based activities, which are reduced or suspended, corresponds to all individual blade pitch control activities, such as only collective pitch control activities remaining unaffected (not reduced and not suspended).

By 'individual blade pitch control' is general understood pitch control of individual blades, as is known in the art and described, e.g., in the reference "*Further Load Reductions with individual Pitch Control*", by E. A. Bossanyi, Wind Energy 2005; 8:481-485, which reference is hereby incorporated by reference in entirety.

In a second aspect, the present invention relates to a computer program product having instructions which, when executed cause a computing device or a computing system to perform a method according to the first aspect.

In a third aspect, the present invention relates to a pitch control system arranged for controlling a hydraulic pitch force system so as to reduce or eliminate a decrease in hydraulic oil pressure if a hydraulic system parameter value is outside a hydraulic system parameter range, the pitch control system being arranged for:

Obtaining the hydraulic system parameter value,
operating the hydraulic pitch force system according to a reduced mode if the hydraulic system parameter value is outside the hydraulic system parameter range, wherein in the reduced mode:
One or more pitch based activities are reduced or suspended.

In a fourth aspect, the present invention relates to a wind turbine comprising a hydraulic pitch system for pitching a blade of the wind turbine, said hydraulic pitch system comprising:
A pitch control system according to the third aspect, and
a hydraulic pitch force system controlled by the pitch control system according to the third aspect
or
a pitch control system arranged for being operated according to the first aspect, and
a hydraulic pitch force system controlled by the pitch control system arranged for being operated according to the first aspect.

In a fifth aspect, the present invention relates to a hydraulic pitch system for pitching a blade of a wind turbine, said hydraulic pitch system comprising:
A pitch control system according to the third aspect, and
a hydraulic pitch force system controlled by the pitch control system according to the third aspect,
or
a pitch control system arranged for being operated according to the first aspect, and
a hydraulic pitch force system controlled by the pitch control system arranged for being operated according to the first aspect.

In a sixth aspect, the present invention relates to a wind turbine comprising a hydraulic pitch system according to the fifth aspect.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
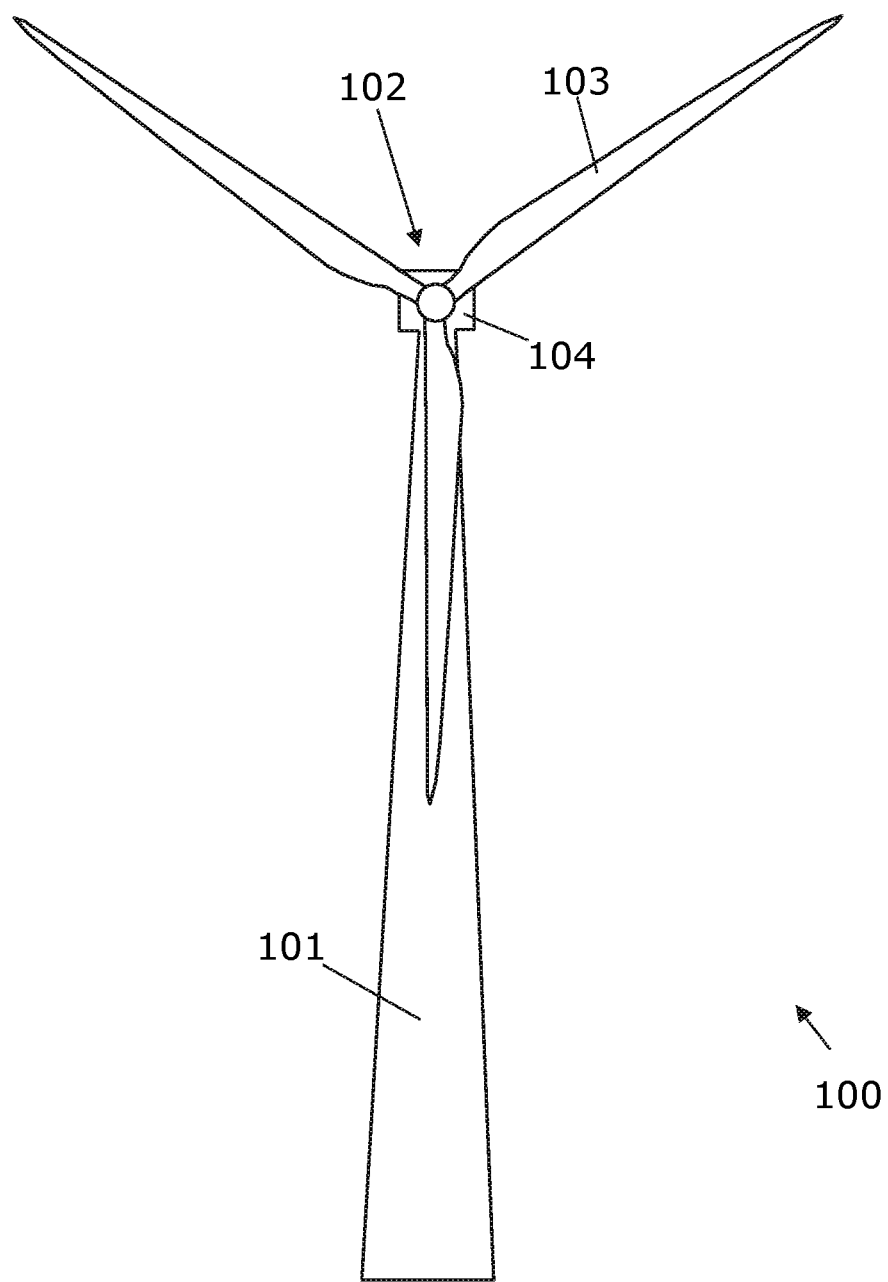
FIG. 1 shows a wind turbine.

FIG. 1 shows a wind turbine 100 (which may also be referred to as a wind turbine generator (WTG)) comprising a tower 101 and a rotor 102 with at least one rotor blade 103, such as three blades. The rotor is connected to a nacelle 104 which is mounted on top of the tower 101 and being adapted to drive a generator situated inside the nacelle. The rotor 102 is rotatable by action of the wind. The wind induced rotational energy of the rotor blades 103 is transferred via a shaft to an electrical generator. Thus, the wind turbine 100 is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into a utility grid. The generator is controllable to produce a power corresponding to a power request.

The blades 103 can be pitched in order to alter the aerodynamic properties of the blades, e.g. in order to maximize uptake of the wind energy and to ensure that the rotor blades are not subjected to too large loads when strong winds are blowing. Furthermore, individual blade pitch control may be utilized for various purposes, in particular for minimizing structural loads on the wind turbine. The blades are pitched by a pitch system with a pitch force system controlled by a pitch control system, where the pitch force system includes actuators for pitching the blades dependent on a pitch request from the pitch control system.

Normal production with wind speed values below rated wind speed does not have large hydraulic power consumption as the wind speed does not change so much and the optimal angle of attack is maintained by controlling the rotor speed. With wind speed values above rated wind speed the pitch system is used more, in particular, in turbulent conditions, since when there is more power in the wind than what the turbine is designed for, the blades are pitched out to reduce the power capture. As the wind speed goes up and down, the blades have to constantly be pitched to compensate. This is typically done simultaneously on all blades, i.e., pitching of all blades is done simultaneously according to a collective pitch reference value 256.

Individual blade pitch control may be employed, e.g., to reduce structural loads on the wind turbine 100. For example, an individual blade 103 pitch control activity may be arranged for reducing a tilt and/or yaw load on a main bearing. This may hereafter be referred to as tilt yaw control (TYC), which is a functionality used for instance when the wind speed is higher in the right hand side than the left hand side of the rotor. Here, TYC will pitch out a blade slightly when being in the left hand side of the rotor. That is, the pitching will typically follow a sinusoidal-like oscillation with the frequency of the rotor and an angle in the range of 2-4 degrees. This costs quite some hydraulic power to perform for all three blades. TYC is a functionality, which may be used under harsh turbulence and shear conditions. Therefore it is very dependent on the local conditions and can thus be used a lot on some turbines and less on others. Furthermore, the use can vary with time of year, the given wind speed, the wind direction, and many others. In some specific cases, it can be used so much it exceeds the hydraulic pitch system's capacity. This happens when the hydraulic accumulator pressure goes below a certain threshold, for example 250 bar, such as 225 bar such as 210 bar, such as 200 bar, such as 190 bar, such as 150 bar. When this happens, the turbine may be shut down as there is no more capacity for safe operation.

To avoid, at least in some instances, that the wind turbine shuts down (since wind turbine shut down affects the productivity), without having to provide costly higher-capacity pitching systems, it is suggested to reduce or suspend one or more pitch based activities.

For example, when a low accumulator 229 pressure is detected (pressure below the oil pressure threshold) the wind turbine 100 enters a reduced mode where the production can be maintained with one or more pitch based activities being reduced or suspended, such as without TYC, and where it is known that no design loads are exceeded, e.g., despite the disablement of TYC. This could mean that the wind turbine 100 reduces the rotor speed and/or the power produced. In many cases the pitch control system 250 could simply be designed to choose to reduce or suspend the TYC activity and then accept a small life-time reduction of the components. If the low-pressure situations occur very seldom, the life-time impact will be very small. If it turns out that the extreme loads become present and wind turbine safety is compromised, such as even with one or more pitch based activities reduced or suspended, such as without TYC, then the speed and/or the power will have to be reduced (this may be referred to as 'derated mode').

In general, the wind turbine may be controlled according to different modes, such as a non-derated and non-reduced mode (which may be referred to as 'normal mode'), a reduced mode (with one or more pitching activities being reduced, and where production might or might not be reduced), and derated mode (production controller is arranged for reducing production to ensure wind turbine safety, optionally reduced mode and derated mode may be combined), and a shut down mode (wherein production is suspended).

In an embodiment, there is presented a method for controlling a wind turbine 100 comprising a hydraulic pitch force system 220, wherein the hydraulic pitch force system is controlled according to any one of the preceding claims, wherein in the reduced mode 692 the method further comprises:

Operating the wind turbine 100 in a derated mode, wherein in the derated mode:

A speed and/or power is limited in order to reduce structural loads on the wind turbine 100.

Instead of deactivating TYC completely the TYC amplitude could gradually be decreased. For instance, if the accumulator 229 goes below a first threshold, for instance, 300 bar, such as 250 bar, such as 220 bar, such as 200 bar, such as 180 bar, the TYC amplitude is lowered slightly. As the accumulator pressure goes down, the TYC amplitude is also decreased, such as linearly or non-linearly decreased, further until the TYC amplitude is zero at a second threshold, for instance the first threshold minus 5 bar, such as minus 10 bar, such as minus 20 bar, such as minus 25 bar, such as minus 50 bar.

In an embodiment, wherein the one or more pitch based activities, which are reduced or suspended, corresponds to an individual blade 103 pitch control activity, wherein in the reduced mode 692 the individual blade pitch control activity is:

Operated with reduced non-zero pitch angular movement, wherein an amount of pitch angular movement reduction depends at least on the hydraulic oil pressure 241.

In some cases, the wind turbine 100 cannot be operated safely without TYC in high wind speeds. In these cases it could be chosen to shut down the turbine in high wind speeds.

In an embodiment, there is presented a method for controlling a wind turbine 100 comprising a hydraulic pitch force system 220, wherein the hydraulic pitch force system 220 is controlled according to any one of the preceding claims, wherein the method further comprises:

Obtaining a value indicative of wind speed value 268, determining based the value indicative of wind speed value 268:

To operate the wind turbine 100 according to a non-derated mode or a derated mode, wherein in the derated mode a speed and/or power is limited in order to reduce structural loads on the wind turbine 100, or to shut down the wind turbine 100.

Figure 2:
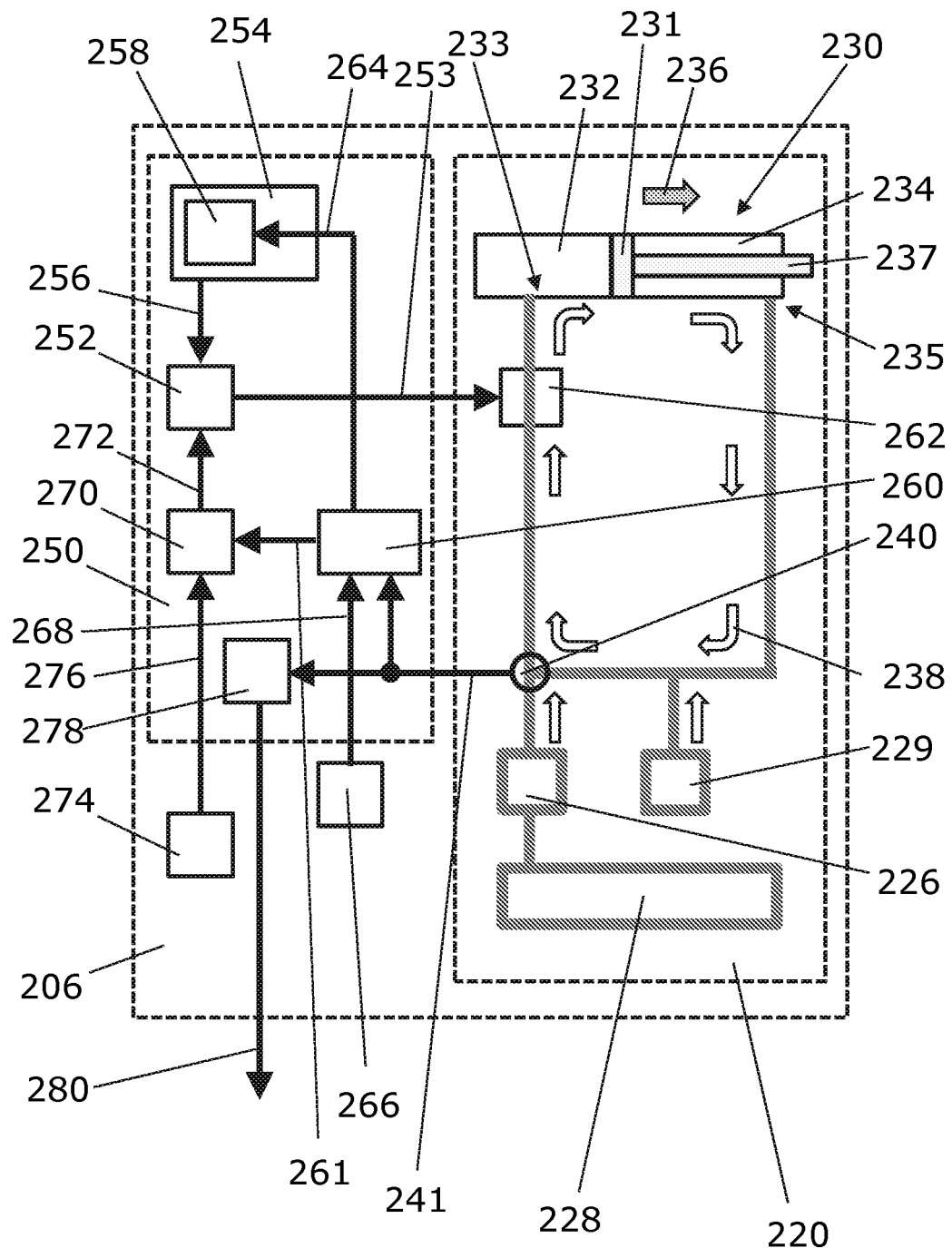
FIG. 2 shows a diagram of a hydraulic pitch system.

FIG. 2 shows a schematic of an embodiment, wherein a mode selector 260 which controls individual blade pitch based activities, such as dictates a TYC amplitude, based on at least the hydraulic oil pressure. The mode selector can contain quite simple logic, e.g., simply turning off TYC if the accumulator pressure falls below a given threshold. It can also be more sophisticated and reduce the TYC amplitude gradually as the accumulator pressure goes down.

The hydraulic accumulator pressure (hydraulic oil pressure 241) is used to evaluate how much of the one or more pitch based activities can be used. Furthermore, the measured accumulator pressure is used to determine if the wind turbine should be set into a safe-mode (derated mode) where the production controller 254 is capable of keeping the loads within the design envelope with the one or more pitch based activities reduced or suspended. The thick grey lines (in the hydraulic pitch force system 220) represent hydraulic lines. The thinner black arrows represent transmission of signals, such as electrical communication.

FIG. 2 shows in more detail a diagram of a hydraulic pitch system 206 for pitching a blade 103 of a wind turbine 100, the hydraulic pitch system 206 comprising:

A pitch force system 220, being a hydraulic pitch force system, comprising:

A hydraulic cylinder 230 for adjusting a pitch angle of the blade, the hydraulic cylinder comprising:

A pitch piston 231 movable in the hydraulic cylinder, a first port 233 fluidically connecting an inside of the hydraulic cylinder with an outside of the hydraulic cylinder and arranged on a first side 232 relative to the pitch piston, and a second port 235 fluidically connecting an inside of the hydraulic cylinder with an outside of the hydraulic cylinder and arranged on a second side 234 relative to the pitch piston, and a tank 228 (which may also be referred to as a reservoir, or a hydraulic reservoir), an accumulator 229, a pump 226, such as an oil pump, arranged for pumping hydraulic fluid from the tank to a side of the pump being opposite the tank, such as to the accumulator 229, so that a pressure on the side of the pump being opposite the tank is higher than a pressure in the tank, a valve 262, such as a proportional valve, which upon opening fluidically connects the first port 233 to the side of the pump being opposite the tank, such as to the accumulator 229, and a pitch control system 250 being controlled according to the first aspect and being arranged for controlling the hydraulic pitch force system 220, the pitch control system comprising:

a valve controller 252, which controls valve 262 by transmitting a valve signal 253 to the valve 262, the valve controller may base the valve signal 253 on A collective pitch reference value 256 (where reference may also be referred to as target pitch value), and Individual blade pitch reference value 272, a production controller 254 which provides and transmits the collective pitch reference value 256 to the valve controller 252, which production controller also comprises a safe mode unit 258, which receives a wind speed value 268, e.g., from a wind speed transceiver 266, wherein the collective pitch reference value 256 may be based upon a collective mode selector signal 264, an individual pitch reference controller 270 which provides and transmits the individual blade pitch reference value 272 to the valve controller 252, and which may base the individual blade pitch reference value 272, on:

A blade load signal 276, e.g., from one or more blade load sensors 274, a individual mode selector signal 261, a mode selector 260, which receives:

An accumulator pressure 241, e.g. from a pressure sensor 240, optionally a signal (not shown in the figures) indicative of leakage in the hydraulic pitch force system 220, and a wind speed value 268, e.g., from a wind speed transceiver 266, the mode selector 260 being arranged to control an individual blade pitch activity and/or a production via, respectively, the individual mode selector signal 261, the collective mode selector signal 264, an accumulator pressure supervision unit 278, which a hydraulic oil pressure value in form of the accumulator pressure 240, and which unit may cause the wind turbine 100 to shut down in case of too low pressure, e.g., by transmission of a shut down signal 280.

Pitching of a blade may be carried out by the valve controller 252, which may transmit a valve signal 253 to the valve 262 to increase a flow to the first side 232 (a-side) of the pitch cylinder 230. This increases the pressure on the first side 232 of the piston 231 and thus increases the pressure difference across the piston and thus applies a pitch force in the outwards direction (from left to right in FIG. 2). The flow is re-circulated to conserve oil flow from the pump, i.e., the second port 235 is fluidically connected to the accumulator 229. Energy is taken out of the pitch force system 220 to move the piston 231 so the pressure in the accumulator 229 drops. If the pressure level of the accumulator 229 goes below a certain level (an accumulator threshold), the pump 226 starts and brings the pressure in the accumulator 229 back to a higher pre-defined level (the accumulator threshold or higher).

The 'collective pitch reference value' is a target (or desired) pitch value, which applies to all blades of a wind turbine.

The 'individual blade pitch reference value' is a target (or desired) pitch value, which applies to an individual blade of a wind turbine.

By using the pump 226 to generate a higher pressure on the side of the pump fluidically connected to the valve 262 than on the side fluidically connected to the tank 228, a pitch force may be exerted (such as exerted on the blade 103) by opening or having opened the valve 262 so as to fluidically connect the side of the pump opposite the tank 228 with the first port 233, such as fluidically connecting the accumulator 229 with the first port 233. Thus, the pitch force may be seen as a pitch force generated by increasing (with respect to time) a pressure on the first side 232 (a-side) of the piston.

The non-filled arrows, such as arrow 238, indicate a direction of flow of hydraulic fluid.

The cylinder 230 may be a differential area cylinder, wherein the areas of the pitch piston 231 facing the first side 232 may be different, such as larger, than an area facing the second side 234, for example due to a piston rod 237 being placed on the second side.

The accumulator may be dispensed with, for example in embodiments with a pump with a large capacity. When referring to 'accumulator' in the present application, it is understood that this may in embodiments without an accumulator be exchanged with 'the side of the pump 226 facing the valve 262, i.e., the side of the pump 226 opposite the tank 228.

The present application focuses on issues related to pitching out (corresponding to moving the piston from left to right in FIG. 2 as indicated by thick filled arrow 236) and therefore only the configuration for moving the piston outwards is included in FIG. 2, i.e., for moving the piston from left to right in the figure. A hydraulic pitch system may furthermore comprise relevant components and arrangements for enabling pitching in the opposite direction, but these have been left out of the present figure for the sake of simplicity.

In general or in embodiments, in the reduced mode the one or more pitch based activities are:
  Operated with reduced 694 non-zero pitch angular movement.

A possible advantage of operating with reduced non-zero pitch angular movement may be that the hydraulic oil pressure may recover (due to the reduction) but at least some of the benefit of pitchin may still be gained (due to the non-zero pitch angular movement).

The one or more pitch based activities may serve different purposes, such as purposes having the advantage that they may reduce a structural load on the wind turbine or components thereof.

In an embodiment, the individual blade 103 pitch control activity is, such as is or comprises, an activity arranged for reducing a tilt and/or yaw load on a main bearing.

In an embodiment, the individual blade 103 pitch control activity is arranged for reducing sideways tower 101 oscillations.

In an embodiment, the individual blade 103 pitch control activity is arranged for reducing fore-aft tower 101 oscillations.

It may be understood, that the individual blade 103 pitch control activity may be arranged for any possible combination of the above, such as arranged for
  reducing a tilt and/or yaw load on a main bearing,
  reducing sideways tower 101 oscillations, and/or
  reducing fore-aft tower 101 oscillations.

In an embodiment, a capacity of the hydraulic pitch force system 220 is employed to a degree larger than 90%, such as to a degree larger than 95%, in the reduced mode 692.

In general or in embodiments, the wind turbine 100 is in power producing operation in the reduced mode 692. Thus, when in the reduced mode, the wind turbine 100 is not shut down, although it may be in derated mode wherein the power production may be reduced but non-zero. It may thus be understood, that the method comprises operating the hydraulic pitch force system according to a reduced mode if the hydraulic system parameter value is outside, such as above and/or below, the hydraulic system parameter range, and if the wind turbine is not shut down.

It may be advantageous, that when the wind turbine has entered the reduced mode, then it can be returned, optionally automatically, to a normal mode (or more specifically to a non-reduced mode). In embodiments, this transition may take place when:
  Hydraulic oil pressure, such as the accumulator pressure, exceeds a threshold.
  a while has passed after entering into reduced mode (and reduced mode may then be re-entered if the hydraulic oil pressure drops too much).
Other options may be to:
  Slowly increase the one or more pitching based activities, such as a TYC activity, and observe the lowest hydraulic oil pressure, such as the lowest accumulator pressure. This pressure level will decrease as the one or more pitching based activities are increased. When the smallest hydraulic oil pressure goes below a specified threshold, the angular movement of the one or more pitch based activities, such as a TYC amplitude, is kept constant or slightly increased.
  employ a linear mapping between a "switch off" below threshold and a "switch on" above threshold. If the two parameters are sufficiently far apart then the risk of limit cycles is minimal and will guarantee a simple activation/deactivation rule for the control feature.

In an embodiment a transition from the reduced mode 692 and into a non-reduced mode takes place when:
  The hydraulic system parameter is within a transition range,
  and/or
  a predetermined period of time has passed since initiation of operation according to the reduced mode 692.

By 'non-reduced mode' may be understood a mode wherein the one or more pitch based activities, such as no pitch based activities, are reduced or suspended.

Figure 3:
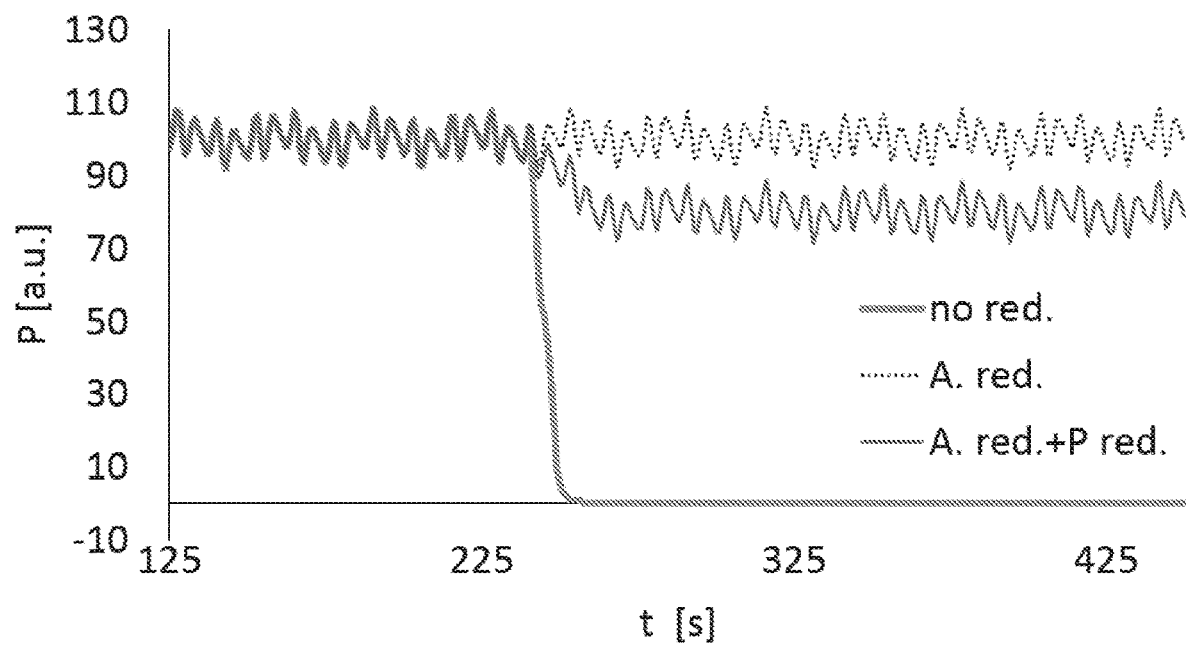
FIG. 3 shows a possible graph of power production vs. time.
Figure 4:
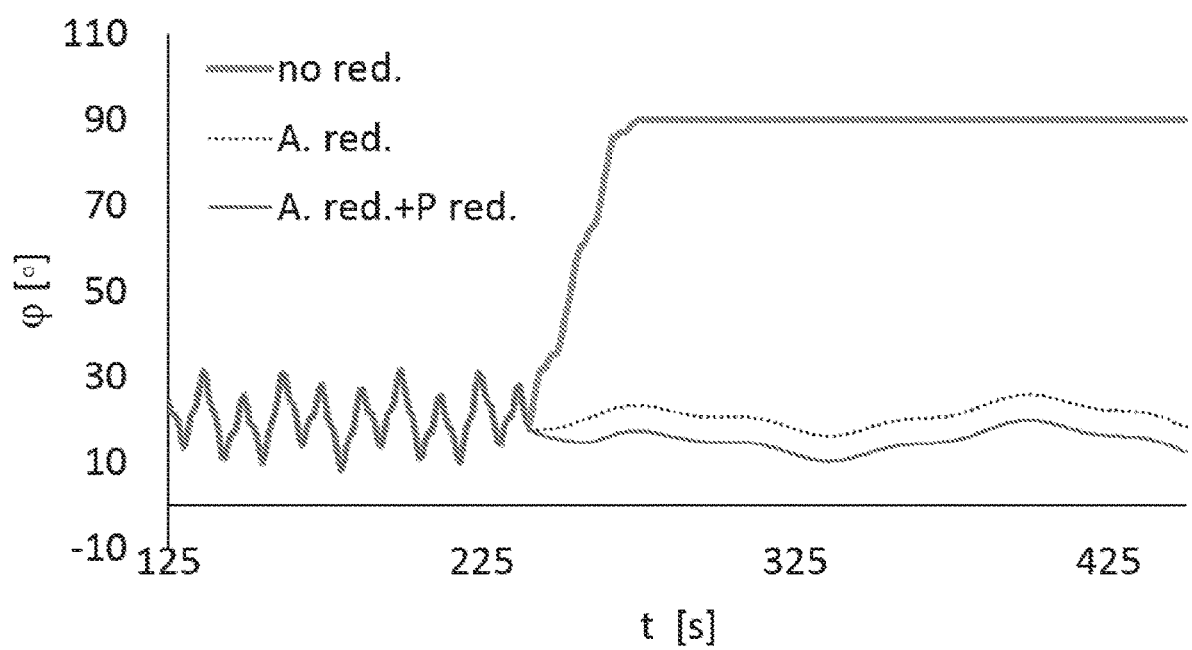
FIG. 4 shows a possible graph of pitch angle vs. time.
Figure 5:
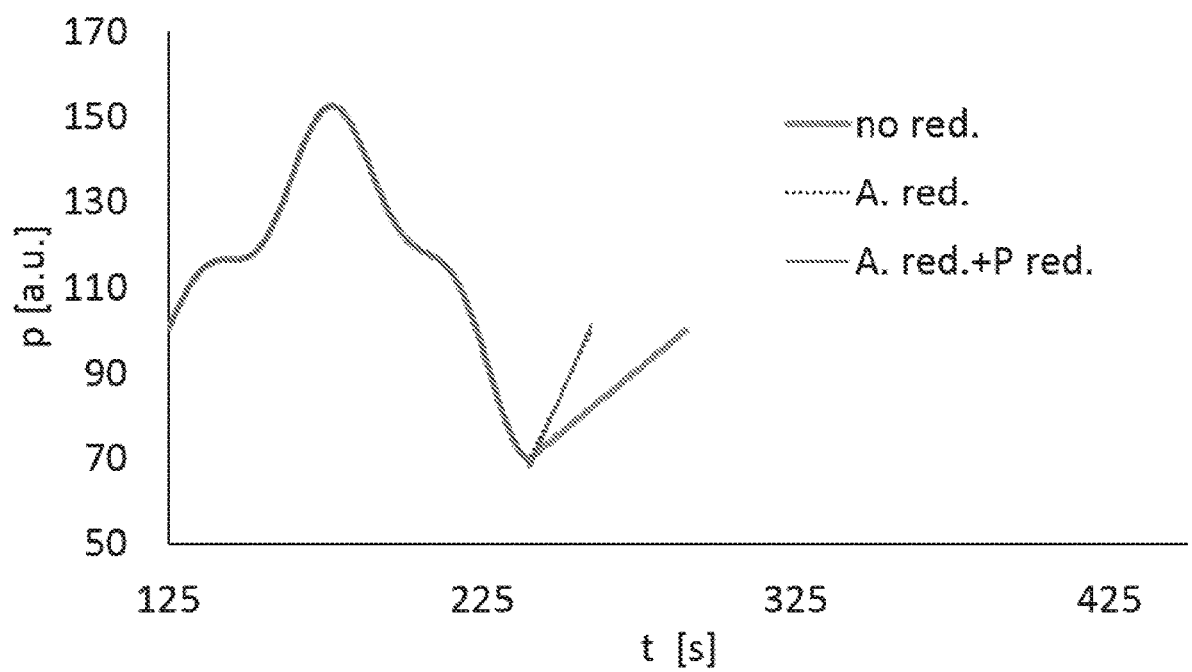
FIG. 5 shows a possible graph of hydraulic oil pressure vs. time.

FIGS. 3-5 show how simulation data could look for a wind speed of 20 m/s and high wind shear (0.35) for various scenarios, in particular for a scenario where reduced mode is not an option (thick, full drawn, grey line, with label "no red."), where a reduced mode is available and wherein TYC is simply turned off instead of shutting down the turbine (thin, dotted, black line, with label "A. red.") and where a reduced mode is available and where TYC is turned off and the power and speed is reduced by 20% to reduce the extreme loads, i.e., entry into both reduced and derated mode (thin, full drawn, grey line, with label "A. red.+P red.).

The accumulator falls below the hydraulic oil pressure threshold at a time corresponding to t=240 seconds. Here the accumulator pressure drops below the hydraulic oil pressure threshold and the wind turbine without reduced mode shuts down. The wind turbine with reduced mode suspends TYC, which enables it to recover accumulator pressure. The wind turbine with reduced mode which enters the derated mode illustrates a scenario where TYC is suspended and the turbine is put in a safe-mode, de-rating both speed and power by 20% to reduce the risk of extreme loads exceedances.

FIG. 3 shows a possible graph of power production vs. time.

FIG. 4 shows a possible graph of pitch angle vs. time. The oscillations reduce significantly when TYC is switched off (after t=240 sec). During this phase the accumulator pressure recovers as operation without TYC has a very small hydraulic consumption.

FIG. 5 shows a possible graph of hydraulic oil pressure vs. time.

Figure 6:
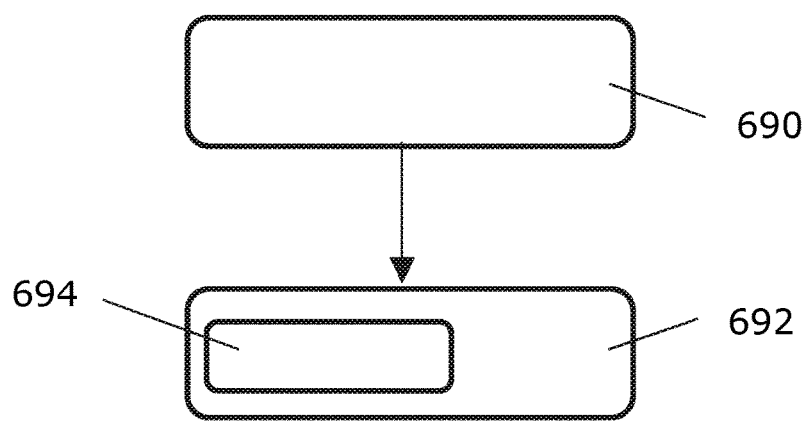
FIG. 6 shows a flow-chart of a method according to an embodiment.

FIG. 6 shows a flow-chart of a method for controlling a hydraulic pitch force system 220 so as to reduce or eliminate a decrease in hydraulic oil pressure 241 if a hydraulic system parameter value is outside a hydraulic system parameter range, the method comprising:

Obtaining 690 the hydraulic system parameter value, operating the hydraulic pitch force system 220 according to a reduced mode 692 if the hydraulic system parameter value is outside the hydraulic system parameter range, wherein in the reduced mode:

One or more pitch based activities are reduced 694 or suspended.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a hydraulic pitch force system of a wind turbine so as to reduce or eliminate a decrease in a hydraulic oil pressure of the hydraulic pitch force system if a hydraulic system parameter value is outside a hydraulic system parameter range, the method comprising:
   operating the wind turbine in one of a non-derated mode and a derated mode that reduces a speed and/or a power of the wind turbine relative to the speed and/or the power while operating in the non-derated mode,
   obtaining the hydraulic system parameter value,
   operating the hydraulic pitch force system according to a non-reduced mode if the hydraulic system parameter value is not outside the hydraulic system parameter range,
   operating the hydraulic pitch force system according to a reduced mode if the hydraulic system parameter value is outside the hydraulic system parameter range,
   wherein in the reduced mode, one or more pitch based activities are reduced or suspended as compared to the non-reduced mode in order to reduce pitch angular movement thereby reducing or eliminating the decrease in the hydraulic oil pressure of the hydraulic pitch force system, and
   the hydraulic pitch force system is switched between the non-reduced mode and the reduced mode independently of whether the wind turbine is operating in the non-derated mode or the derated mode so that for at least a portion of the time the hydraulic pitch force system is operated in the reduced mode, the wind turbine is operating in the non-derated mode.

2. The method according to claim 1, wherein:
   the hydraulic system parameter value is a value corresponding to a hydraulic system parameter, and wherein the hydraulic system parameter is given by the hydraulic oil pressure, and
   the hydraulic system parameter range has a lower limit given by an oil pressure threshold so that the hydraulic system parameter value is outside the hydraulic system parameter range when the hydraulic system parameter value is below the oil pressure threshold.

3. The method according to claim 2, wherein the one or more pitch based activities, which are reduced or suspended, corresponds to an individual blade pitch control activity, wherein in the reduced mode the individual blade pitch control activity is:
   operated with reduced non-zero pitch angular movement, wherein an amount of pitch angular movement reduction depends at least on the hydraulic oil pressure.

4. The method according to claim 1, wherein:
   the hydraulic system parameter value is a value corresponding to a hydraulic system parameter, and wherein the hydraulic system parameter is given by a parameter indicative of leakage from the hydraulic pitch force system, and
   the hydraulic system parameter range has an upper limit given by a threshold leakage value so that the hydraulic system parameter value is outside the hydraulic system parameter range when the hydraulic system parameter value is above the threshold leakage value.

5. The method according to claim 1, wherein in the reduced mode the one or more pitch based activities are operated with reduced non-zero pitch angular movement.

6. The method according to claim 1, wherein the one or more pitch based activities, which are reduced or suspended, corresponds to an individual blade pitch control activity.

7. The method according to claim 6, wherein the individual blade pitch control activity is an activity arranged for reducing a tilt and/or yaw load on a main bearing.

8. The method according to claim 6, wherein the individual blade pitch control activity is arranged for reducing sideways tower oscillations.

9. The method according to claim 6, wherein the individual blade pitch control activity is arranged for reducing fore-aft tower oscillations.

10. A method for controlling a wind turbine comprising a hydraulic pitch force system, wherein the hydraulic pitch force system is controlled according to claim 1, wherein in the reduced mode the method further comprises:
    operating the wind turbine in the derated mode,
    wherein in the derated mode the speed and/or the power is limited in order to reduce structural loads on the wind turbine.

11. A method for controlling a wind turbine comprising a hydraulic pitch force system, wherein the hydraulic pitch force system is controlled according to claim 1, wherein the method further comprises:
    obtaining a value indicative of wind speed value, and
    determining based on the value indicative of wind speed value:
       to operate the wind turbine according to the non-derated mode or the derated mode, wherein in the derated mode the speed and/or the power is limited in order to reduce structural loads on the wind turbine, or
       to shut down the wind turbine.

12. A method for controlling a wind turbine comprising a hydraulic pitch force system, wherein the hydraulic pitch force system is controlled according to claim 1, and a transition from the reduced mode and into the non-reduced mode takes place when:
    a hydraulic system parameter is within a transition range, and/or a predetermined period of time has passed since initiation of operation according to the reduced mode.

13. Computer program product comprising a non-transitory medium having instructions which, when executed, cause a computing device or a computing system to perform a method according to claim 1.

14. A wind turbine comprising a hydraulic pitch system for pitching a blade of the wind turbine, said hydraulic pitch system comprising:
- a pitch control system arranged for being operated according to claim 1, and
- the hydraulic pitch force system controlled by the pitch control system.

15. A pitch control system arranged for controlling a hydraulic pitch force system of a wind turbine so as to reduce or eliminate a decrease in a hydraulic oil pressure of the hydraulic pitch force system if a hydraulic system parameter value is outside a hydraulic system parameter range, the wind turbine including a non-derated mode and a derated mode that reduces a speed and/or a power of the wind turbine relative to the speed and/or the power while operating in the non-derated mode, the pitch control system being arranged for:
- obtaining the hydraulic system parameter value,
- operating the hydraulic pitch force system according to a non-reduced mode if the hydraulic system parameter value is not outside the hydraulic system parameter range,
- operating the hydraulic pitch force system according to a reduced mode if the hydraulic system parameter value is outside the hydraulic system parameter range,
- wherein in the reduced mode one or more pitch based activities are reduced or suspended as compared to the non-reduced mode in order to reduce pitch angular movement thereby reducing or eliminating the decrease in the hydraulic oil pressure of the hydraulic pitch force system, and
- the pitch control system switches operation of the hydraulic pitch force system between the non-reduced mode and the reduced mode independently of whether the wind turbine is operating in the non-derated mode or the derated mode so that for at least a portion of the time the hydraulic pitch force system is operated in the reduced mode, the wind turbine is operating in the non-derated mode.

16. A wind turbine comprising a hydraulic pitch system for pitching a blade of the wind turbine, said hydraulic pitch system comprising:
- a pitch control system according to claim 15, and
- the hydraulic pitch force system controlled by the pitch control system.

\* \* \* \* \*